Patented July 14, 1931

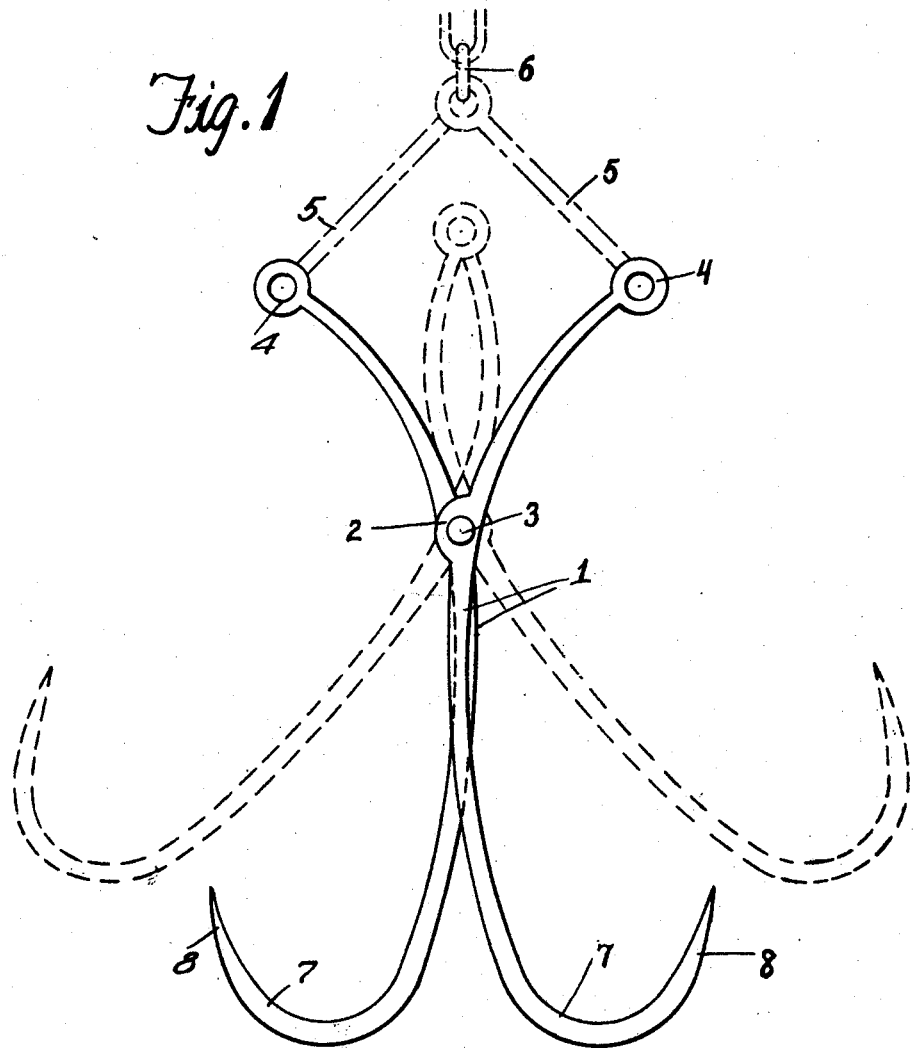

1,814,037

UNITED STATES PATENT OFFICE

EDSON H. HAZEN AND GEORGE P. WELLINGTON, OF EAST JAFFREY, NEW HAMPSHIRE

EXPANDING GRAPPLE

Application filed April 11, 1930. Serial No. 443,507.

Many valuable fur bearing animals are lost to the trapper by such animals dragging the trap and the chain attached thereto to places obscured from the trapper in making his rounds, and, therefore, it is the object of this invention to provide a grapple designed to be attached to the chain of the trap, and which comprises a pair of pivotally connected members that merge into rounded beaks which are curved in opposite directions or away from each other so that the same will hookingly engage in brush, trees or the like and thereby prevent the trapped animal from making his escape.

To the attainment of the foregoing the invention consists in the improvement hereinafter described and definitely claimed.

In the drawings:

Figure 1 is a plan view of our improved grapple.

Figure 2 is an edge view thereof.

As disclosed by the drawings our grapple is of an extremely simple construction, the same primarily comprising only two parts which are of the same construction and which are pivotally connected.

The grapple comprises a pair of arched or rounded bars 1 which are preferably flat and which are arranged in lapping relation. The bars 1 have their confronting edges, at points adjacent to what we will term the outer end of the grapple formed with enlargements 2 through which there is passed a pivot pin 3. The arched or curved bars 1 have their upper or outer ends merging into eyes 4 and to these eyes are connected links or chains 5 which in turn are connected to a chain 6 which is attached to a trap (not shown). The second end of each of the bars 1 is rounded to provide oppositely directed or outwardly extending hooks 7. For distinction we will refer to the pointed ends of the hooks as beaks and have indicated the same in the drawings by the numeral 8. The beaks are arched away from each other so that the same are disposed away from the sides of the respective lapping and pivotally connected bars 1.

The eye carrying ends of the improvement are normally arched or curved away from each other, as disclosed by full lines in Figure 1 of the drawings, while the hooks 7 are slightly disposed away from each other. Should a trapped animal attempt to escape with the trap a pull will be exerted upon the chain 6 and the flexible elements 5 to swing the bars 1 to the position illustrated by the dotted lines in Figure 1 of the drawings. This spreads the hooked ends of the bars a material distance away from each other, and the laterally curved or rounded beaks 8 will be brought to position to anchor the grapple in a ground surface or if the strength of the animal is such as to cause the beaks to plow through such ground surface the hooks will engage with weeds or other growths or the beaks thereof will penetrate an obstacle such as a tree or the like when brought thereagainst. Thus it will be noted that by the simple construction of our improvement the escape of the trapped animal is effectively prevented and the advantages of the improvement will, it is thought, be apparent to those skilled in the art without further detailed description.

Having described the invention, we claim:—

A grapple for the purpose set forth, comprising two similarly constructed oppositely arched bars having lapping portions pivotally connected and having one of their rounded ends merging into eyes, to be engaged by flexible elements attached to the chain of a trap, the opposite ends of the bars being formed with outwardly extending hooks having beak ends disposed at opposite curvatures with respect to the longitudinal planes of the bars and directed toward the eye ends of the bars.

In testimony whereof we affix our signatures.

EDSON H. HAZEN.
GEORGE P. WELLINGTON.